(12) United States Patent
Ha et al.

(10) Patent No.: US 9,655,411 B2
(45) Date of Patent: May 23, 2017

(54) BUCKLE FOR CONNECTOR, AND METHOD FOR ASSEMBLING SAME

(71) Applicant: Sanoh Industrial Co., Ltd, Tokyo (JP)

(72) Inventors: Huy Hung Ha, Ibaraki (JP); Yoshihiko Kawai, Tokyo (JP)

(73) Assignee: Sanoh Industrial Co., Ltd., Tokyo (JP)

( * ) Notice: Subject to any disclaimer, the term of this patent is extended or adjusted under 35 U.S.C. 154(b) by 0 days.

(21) Appl. No.: 14/651,825

(22) PCT Filed: Oct. 31, 2013

(86) PCT No.: PCT/JP2013/079489
§ 371 (c)(1),
(2) Date: Jun. 12, 2015

(87) PCT Pub. No.: WO2014/097753
PCT Pub. Date: Jun. 26, 2014

(65) Prior Publication Data
US 2015/0296927 A1    Oct. 22, 2015

(30) Foreign Application Priority Data

Dec. 18, 2012 (JP) ................................. 2012-276146

(51) Int. Cl.
*A44B 11/25* (2006.01)
*B60R 22/12* (2006.01)

(52) U.S. Cl.
CPC ....... *A44B 11/2511* (2013.01); *A44B 11/2515* (2013.01); *A44B 11/2534* (2013.01); *A44B 11/2561* (2013.01); *B60R 22/12* (2013.01)

(58) Field of Classification Search
CPC ............. Y10T 24/4566; Y10T 24/4567; Y10T 24/45665; Y10T 24/45723; Y10T 24/45733; Y10T 24/45743; Y10T 24/45775; Y10T 24/45785; A44B 11/2511; A44B 11/2534; A44B 11/2561; A44B 11/2515; B60R 22/12
See application file for complete search history.

(56) References Cited

U.S. PATENT DOCUMENTS

2001/0008038 A1    7/2001    Haas
2002/0092141 A1    7/2002    Rohrle et al.

FOREIGN PATENT DOCUMENTS

JP    2001-231612    8/2001
JP    2002-249019    9/2002
JP    2007-083797    4/2007

*Primary Examiner* — Abigail Morrell
(74) *Attorney, Agent, or Firm* — Carmody Torrance Sandak & Hennessey LLP

(57) ABSTRACT

A buckle for a connector having a small simple structure and a favorable productivity, and a method for assembling the same. A buckle for connector of the present invention for supporting a tongue engageably/disengageably includes a base member, a latch member, an unlocking member, a latch spring, an ejector, an ejector spring, and cover members housing these members. The base member includes first and second plates. The ejector includes: two arms; a body section between the arms that includes a pushing/moving surface for the tongue to be pushed/moved by the tongue, a support section to support the latch member, and a pushing surface to be pushed by the ejector spring; and claws formed at ends of the arms and locked with an aperture at a terminal end of the base member, the terminal end being opposite to a starting end from which the tongue is inserted.

7 Claims, 12 Drawing Sheets

Prior Art

BUCKLE FOR CONNECTOR, AND METHOD FOR ASSEMBLING SAME

TECHNICAL FIELD

The present invention relates to a buckle for a connector used in conjunction with a seat belt of a vehicle, and a method for assembling the same.

BACKGROUND ART

With a three-point seat belt, a passenger constrains his/her body by pulling a seat belt tongue held at his/her shoulder to withdraw a shoulder belt and waist belt formed of one webbing simultaneously, and inserting the seat belt tongue into a seat belt buckle provided at a seat portion opposite to the position from where the waist belt is withdrawn in a manner to constrain the upper body and waist of the passenger.

The structure from which the waist belt is withdrawn is classified into a structure configured to fix one end of the waist belt to the seat or a surrounding member directly, and a structure configured to fix one end of the waist belt engageably and disengageably to the seat or a surrounding member via a buckle. The buckle in the latter structure is called a connector buckle, and used as engaged with a connector buckle tongue provided at the one end side of the waist belt. Except for such occasions as vehicle maintenance or the like, this connector buckle is usually kept engaged with the connector buckle tongue, so that it is possible to fasten the seat belt anytime by engaging a seat belt tongue into a seat belt buckle. A buckle structure of this type is disclosed in, e.g., PTL 1.

Connector buckles are required to have a smaller and simpler structure, because connector buckles are obstacles against utilization of the space inside the vehicles. Particularly, in the back seat, a large connector buckle would touch the waist of a passenger and give an uncomfortable feeling. In a type of a vehicle in which the seat belt device can be retracted inside the vehicle when nobody is sitting, a connector buckle left on the seat would become an obstacle against space utilization such as mounting of baggage on the seat, etc.

An example of a buckle structure that has been put into practical use as a connector buckle will be described with reference to FIG. 1. FIG. 1 is an exploded perspective diagram of a structure of a conventional connector buckle.

The conventional connector buckle 100 is composed of a base member 110, a latch member 120, an unlocking member 130, a leaf spring 135, an ejector 140, a coil spring 145, a stopper member 150, and cover members 160a and 160b.

Each member will be described. The base member 110 includes: an inner region 111 into which a tongue 101 having a locking groove 102 in a side thereof along an inserting direction I can be inserted; and slide grooves 112 formed in upper and lower facing surfaces of the base member 110, respectively. The latch member 120 is inserted through the slide grooves 112 of the base member 110 and disposed such that both ends thereof stick out from the base member 110. The unlocking member 130 is a squared-U-shaped member which, with an open mouth thereof ahead, is externally fitted over a side surface of the base member 110, and includes locking support portions 131a and 131b configured to be locked with the both ends of the latch member 120 sticking out from the base member 110 such that the unlocking member 130 is supported in the externally fitted state. The leaf spring 135 is inserted between the base member 110 and the unlocking member 130, and biased to slide the unlocking member 130 in a first sliding direction $X_1$ of the latch member 120. The ejector 140 is provided in the inner region 111 of the base member 110. The coil spring 145 is provided between the ejector 140 and the stopper member 150, and biased to push out the ejector 140 in a releasing direction E opposite to the inserting direction I of the tongue 101. The stopper member 150 is a member having a bracket shape in a plan view, and provided on the base member 110 such that locking portions 151a and 151b thereof formed at ends thereof are locked with claws 113a and 113b of the base member 110. The upper and lower two cover members 160a and 160b house therein the base member 110 fitted with these members in the way described above in a manner to sandwich it, and are fixed in the housing state by means of a screw 161.

In the connector buckle 100 configured as described above, when the tongue 101 is inserted along the inserting direction I, the latch member 120 slides in a second sliding direction $X_2$ once by being pushed and moved by a head of the tongue 101, and when it is at the locking groove 102 of the tongue 101, slides in the first sliding direction $X_1$ by means of the leaf spring 135, to be thereby locked with the locking groove 102 of the tongue 101. At the same time, the ejector 140 is pushed and moved by the head of the tongue 101 and thrust into the stopper member 150 by resisting being biased by the coil spring 145. In this way, the tongue 101 is engaged with the connector buckle 100.

On the other hand, disengagement of the connector buckle 100 and the tongue 101 is done by inserting a member such as a vehicle key into a cutout 162 formed in the cover member 160b to push and move the unlocking member 130 in a manner to slide the latch member 120 in the second sliding direction $X_2$ to thereby release the latch member 120 from the locking groove 102 of the tongue 101. When such a pushing/moving operation is given, the ejector 140 pushes out the tongue 101 in the releasing direction E by being biased by the coil spring 145, and the tongue 101 is released from the connector buckle 100.

The connector buckle 100 has the problems described below.

First, formation of the facing surfaces of the base member 110 is performed by folding the base member 110 at a folding position that is to become the side surface over which the unlocking member 130 is externally fitted. Specifically, sheet-metal working is performed using a sheet metal having a size corresponding to the inner region 111 as an insert member, to fold a flat-plate member to conform to the shape of the sheet metal and thereby form the base member 110 folded to have facing surfaces.

However, in the base member 110 formed in this way, the inner region 111 cannot have a height shorter than the thickness of the sheet metal, which leads to a problem that the base member 110 cannot avoid being thick. A conceivable way to overcome this problem may be to use a thin sheet metal. However, mechanical strength of a thin sheet metal is low, and the sheet metal may be torn during working.

Next, when the ejector 140 is to be assembled on the base member 110, the ejector 140 is tied up with the coil spring 145 and the stopper member 150 beforehand, and in this state, inserted into the inner region 111 of the base member 110. Because the stopper member 150 is to be held at a height that is above the inner region 111, it is necessary to assemble the ejector 140 diagonally into the inner region 111 by holding the ejector 140 at a height lower than the stopper member 150. That is, because the stopper member 150 is supposed to support the ejector 140 by enduring the tongue 101 to be inserted, the stopper member 150 is to be fixed on the base member 110 by a protrusion 153 thereof being inserted into a locking hole 114 formed in the base member 110. Hence, the stopper member 150 is held at a height that is above the inner region 111 by an amount corresponding to the height of the protrusion 153, which makes it necessary to perform the assembly diagonally. It is difficult to perform such diagonal assembly mechanically, which is a cause of reducing the productivity of the connector buckle 100.

Hence, in the current circumstances, there is no satisfactory connector buckle available that has a small and simple structure and has a favorable productivity.

CITATION LIST

Patent Literature

PTL 1: Japanese Patent Application Laid-Open (JP-A) No. 2007-83797

SUMMARY OF INVENTION

Technical Problem

The present invention aims to solve the various conventional problems described above and achieve the object described below. That is, an object of the present invention is to provide a buckle for a connector that has a small and simple structure and has a favorable productivity, and a method for assembling the same.

Solution to Problem

A solution to the problems described above are as follows.
<1> A buckle for a connector, including:
a metallic base member including an inner region into which a tongue having a locking groove in a side thereof along an inserting direction can be inserted, and slide grooves formed in both of facing surfaces of the base member respectively;
a columnar latch member inserted through the slide grooves of the base member and disposed such that both ends thereof stick out from the base member, and configured to be locked with the locking groove of the tongue to be inserted, by, when it is at the locking groove of the tongue, sliding in a first sliding direction that is along a groove inward direction of the locking groove;
an unlocking member that is a squared-U-shaped member which, with an open mouth thereof ahead, is externally fitted over the base member, and that includes locking support portions in both of facing surfaces thereof respectively, the locking support portions being configured to be locked with the both ends of the latch member sticking out from the base member such that the unlocking member is supported in an externally fitted state, the unlocking member being configured to slide the latch member in a second sliding direction opposite to the first sliding direction when a pushing operation is given from outside, to unlock the tongue and the latch member from each other;
a latch spring inserted between the base member and the unlocking member, and configured to bias the unlocking member in the first sliding direction to support the tongue and the latch member in a locked state;
an ejector provided in the inner region of the base member, and configured to push out the tongue in a releasing direction opposite to the inserting direction during unlocking of the tongue inserted and the latch member, configured to support the latch member at a position reached by the pushing, and configured to be released from supporting the latch member by being pushed and moved by the tongue inserted, to enable the tongue and the latch member to be locked with each other;
an ejector spring inserted between a stopper member and the ejector and configured to bias the ejector in the releasing direction of the tongue, the stopper member being a member defining the inner region at a deepest position in the inserting direction of the tongue; and
a cover member housing those described above,
wherein the buckle for a connector is configured to support the tongue engageably and disengageably,
wherein the base member includes: a bracket-shaped first plate, both side walls of which are formed along the inserting direction, and a planar surface of which has an opening; and a flat-plate-shaped second plate disposed to cover the opening of the planar surface of the first plate while forming an aperture along the inserting direction, and
wherein the ejector includes: two arms extending along the inserting direction and configured to be inserted into the base member from outside by being slid against the side walls; a body section held between the arms and including a pushing/moving surface for the tongue, which is to be pushed and moved by the tongue, a support section configured to support the latch member slid in the second sliding direction, and a pushing surface to be pushed by the ejector spring; and claws formed at ends of the arms and configured to be locked with the aperture at a terminal end of the base member, the terminal end being opposite to a starting end that is at a side from which the tongue is inserted.
<2> The buckle for a connector according to <1>,
wherein the claws of the arms are locked with terminal ends of the side walls of the first plate, respectively.
<3> The buckle for a connector according to <1> or <2>,
wherein the stopper member is formed integrally with a terminal end of the second plate.
<4> The buckle for a connector according to any one of <1> to <3>,
wherein the latch spring is a coil spring, and the first plate has a positioning groove at a side surface thereof that is at a side at which the unlocking member is externally fitted, the positioning groove being configured to be locked with one end of the coil spring.
<5> The buckle for a connector according to any one of <1> to <4>,
wherein the base member includes a position restricting portion facing a side surface of the first plate that is at a side at which the unlocking member is externally fitted, and configured to restrict a move, in each sliding direction, of the tongue inserted.
<6> The buckle for a connector according to <5>,
wherein the position restricting portion is formed by bending part of at least one of the first plate and the second plate toward a planer surface of the opposite plate.
<7> The buckle for a connector according to any one of <1> to <6>,
wherein the ejector includes a columnar gripping portion extending in the releasing direction from a base end of one of the two arms, the one arm being the arm inserted into the base member by being slid against a side surface opposite to a side surface at a side at which the unlocking member is externally fitted.
<8> A connector buckle assembling method for assembling the buckle for a connector according to any one of <1> to <7>, including:

an ejector assembling step of inserting the ejector internally into the base member substantially horizontally from the starting end toward the terminal end, such that the ejector supports one end of the ejector spring;

a latch member assembling step of disposing the latch member to be inserted through the slide grooves of the base member;

an unlocking member assembling step of externally fitting the unlocking member over the base member via the latch spring, and disposing the locking support portions of the unlocking member to be locked with the latch member; and a cover member assembling step of disposing the cover member to house therein the base member over which the unlocking member is externally fitted.

Advantageous Effects of Invention

The present invention can solve the various problems of the conventional art described above, and can provide a buckle for a connector that has a small and simple structure and has a favorable productivity, and a method for assembling the same.

DESCRIPTION OF EMBODIMENTS

A buckle for a connector according to one embodiment of the present invention will be described in detail with reference to the drawings.

Figure 1:
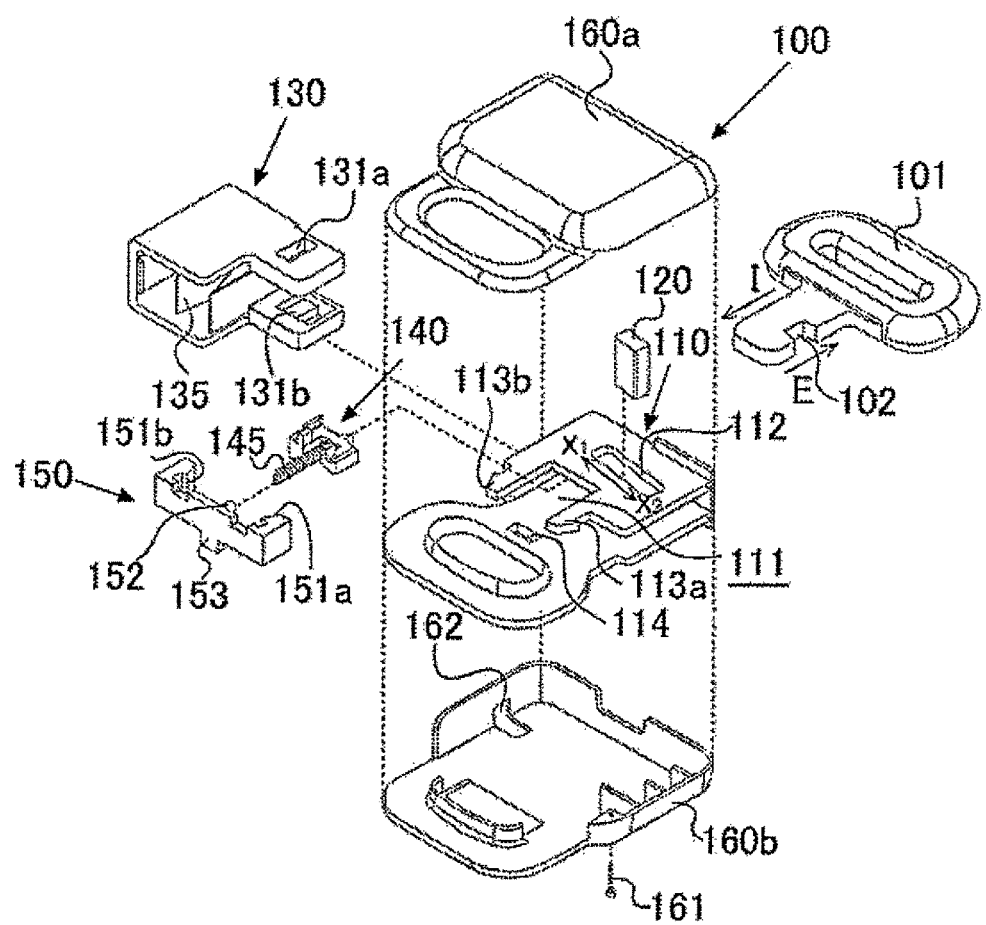
FIG. 1 is an exploded perspective diagram of a conventional connector buckle.
Figure 2A:
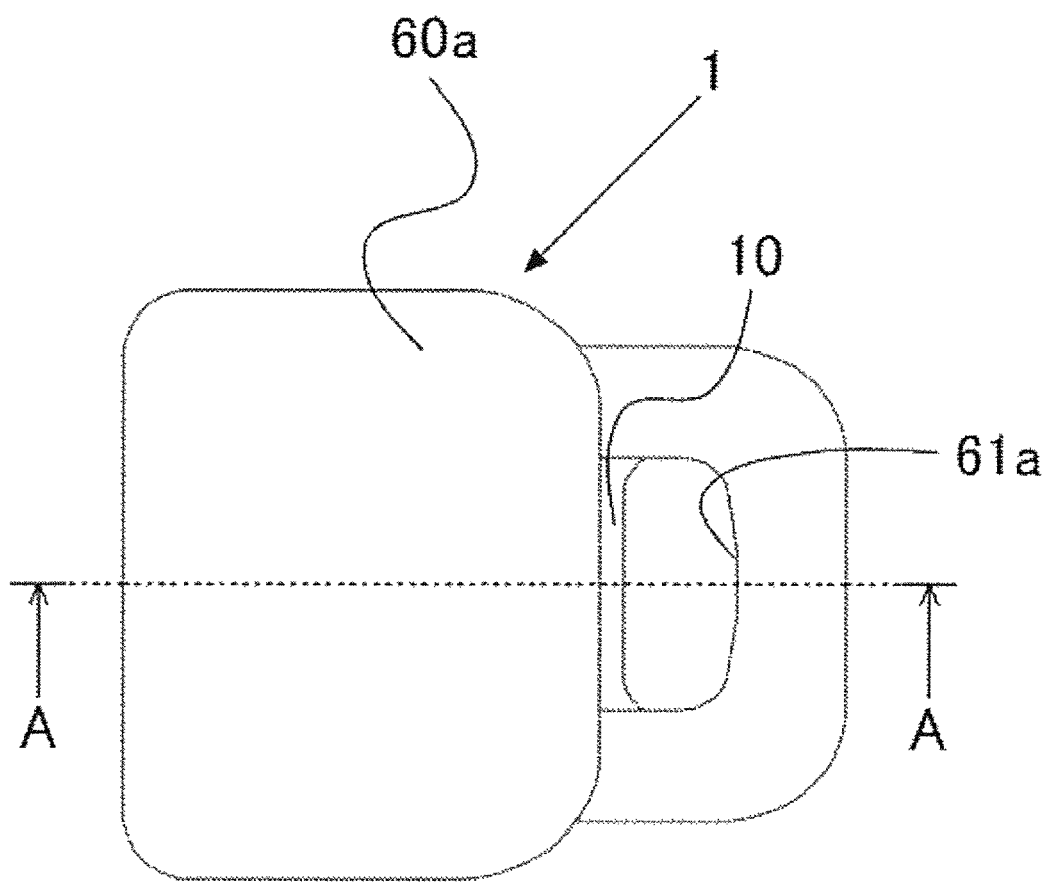
FIG. 2A is a plan view of a buckle for a connector according to one embodiment of the present invention.
Figure 2B:
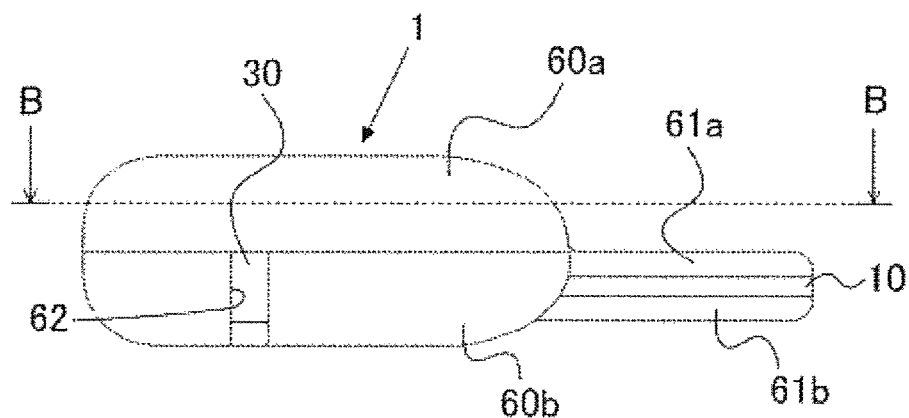
FIG. 2B is a side elevation of a buckle for a connector according to one embodiment of the present invention.
Figure 2C:
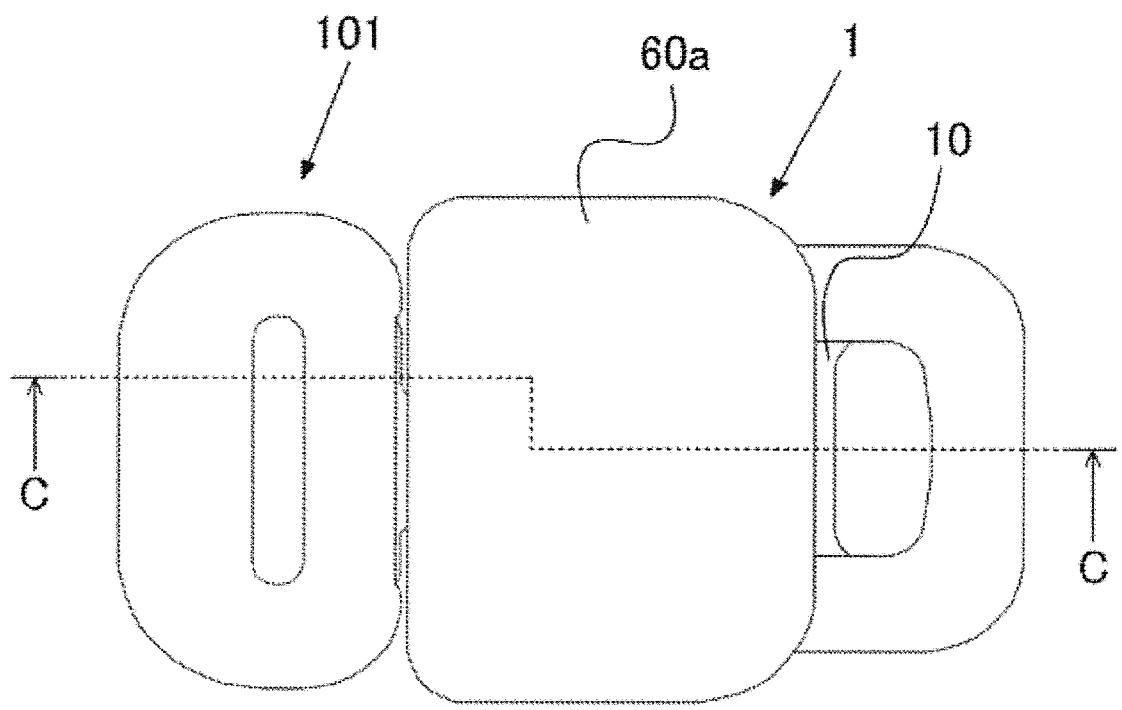
FIG. 2C is a plan view of a buckle for a connector, showing a state of being engaged with a tongue.
Figure 2D:
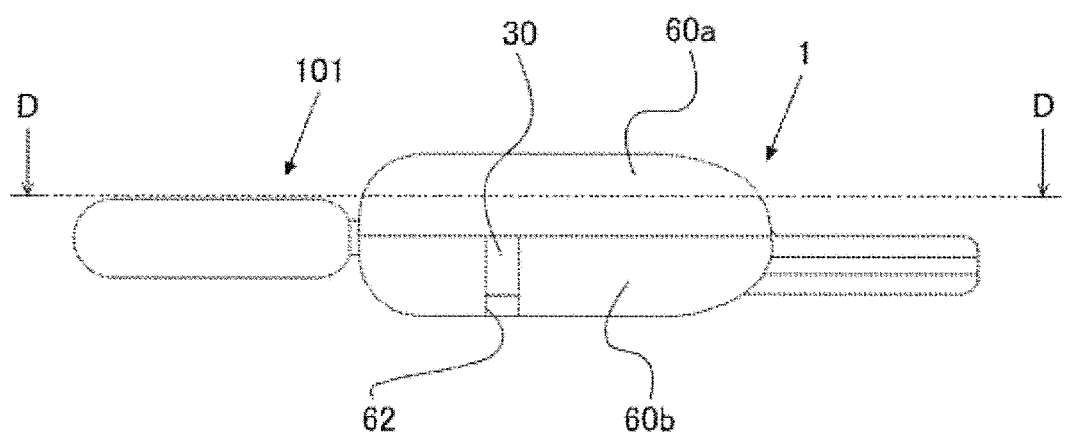
FIG. 2D is a side elevation of a buckle for a connector, showing a state of being engaged with a tongue.

FIG. 2A is a plan view of a buckle for a connector according to one embodiment of the present invention. FIG. 2B is a side elevation thereof. FIG. 2C is a plan view of the buckle for a connector in a state of being engaged with a tongue. FIG. 2D is a side elevation thereof.

As shown in these drawings, the buckle for a connector 1 is constructed such that the buckle structure thereof is housed in a cover member composed of an upper cover 60a and a lower cover 60b, and is engageable with and disengageable from a tongue 101. The upper cover 60a and the lower cover 60b have ring portions 61a and 61b in which a webbing extended from an arbitrary vehicle member is hooked to be passed around.

Figure 3:
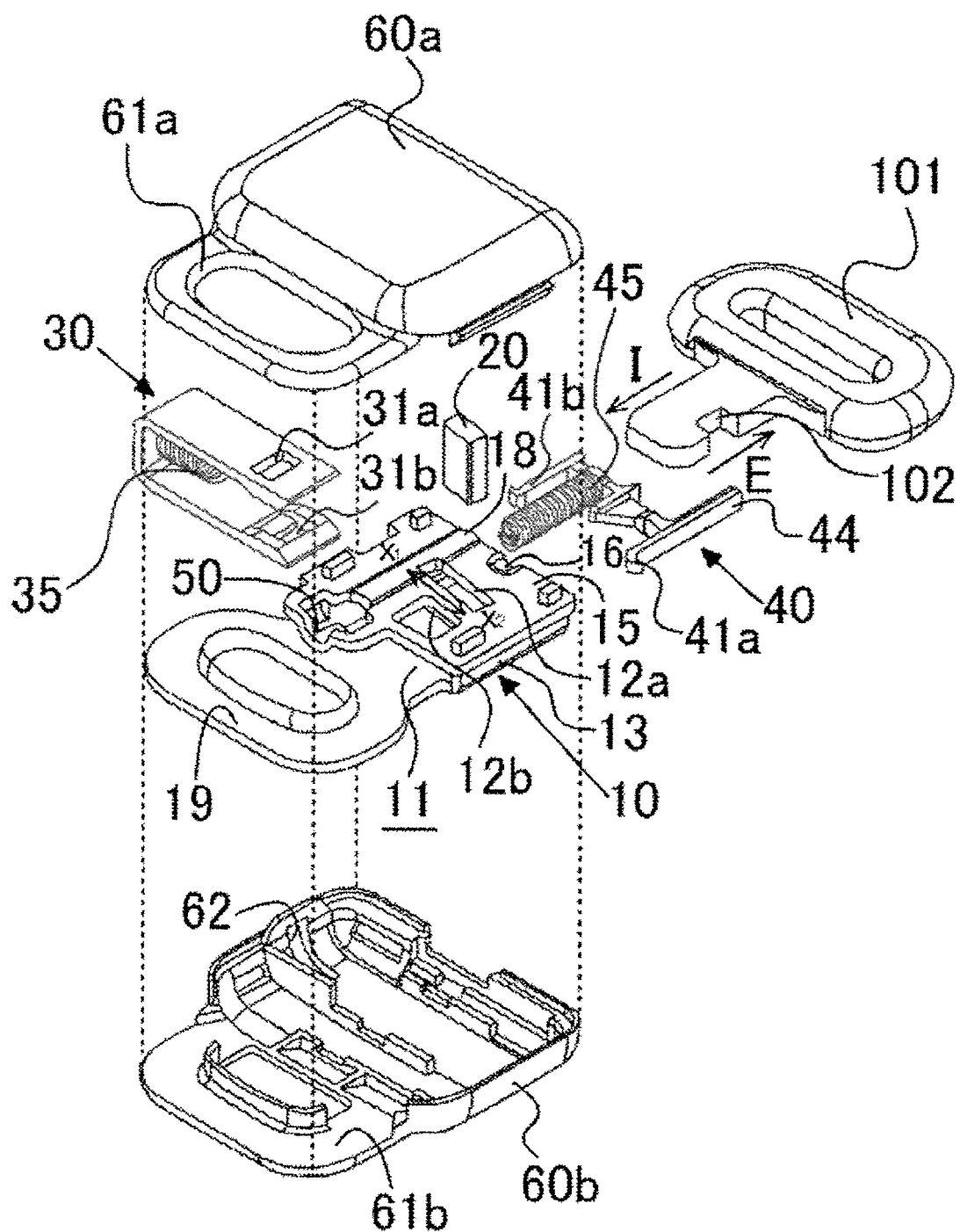
FIG. 3 is an exploded perspective diagram of a buckle for a connector according to one embodiment of the present invention.

The buckle structure of the buckle for a connector 1 will be described with reference to FIG. 3. FIG. 3 is an exploded perspective diagram of a buckle for a connector according to one embodiment of the present invention.

The buckle for a connector 1 is composed of; a base member 10 formed of a first plate 13 and a second plate 15; a latch member 20; an unlocking member 30; a latch sprint 35; an ejector 40; an ejector spring 45; and the upper cover 60a and lower cover 60b described above.

The first plate 13 is made of a bracket-shaped metal member having an opening in a planar surface thereof, and both side walls thereof are formed along an inserting direction I of the tongue 101. The second plate 15 is made of a flat-plate-shaped metal member, and disposed to cover the opening of the first plate 13. By constructing the base member as such a sandwich structure based on the two plate members, it is possible to make the base member on the whole thin, and as a result, to make the buckle for a connector 1 small.

An inner region 11 defined by the first plate 13 and the second plate 15 has a size into which the tongue can be inserted. The surfaces of the first plate 13 and second plate 15 facing each other have slide grooves 12a and 12b respectively, along which the latch 20 can slide.

The first plate 13 has a ring portion 19 in which a webbing extended from an arbitrary vehicle member is hooked to be passed around.

Figure 4A:
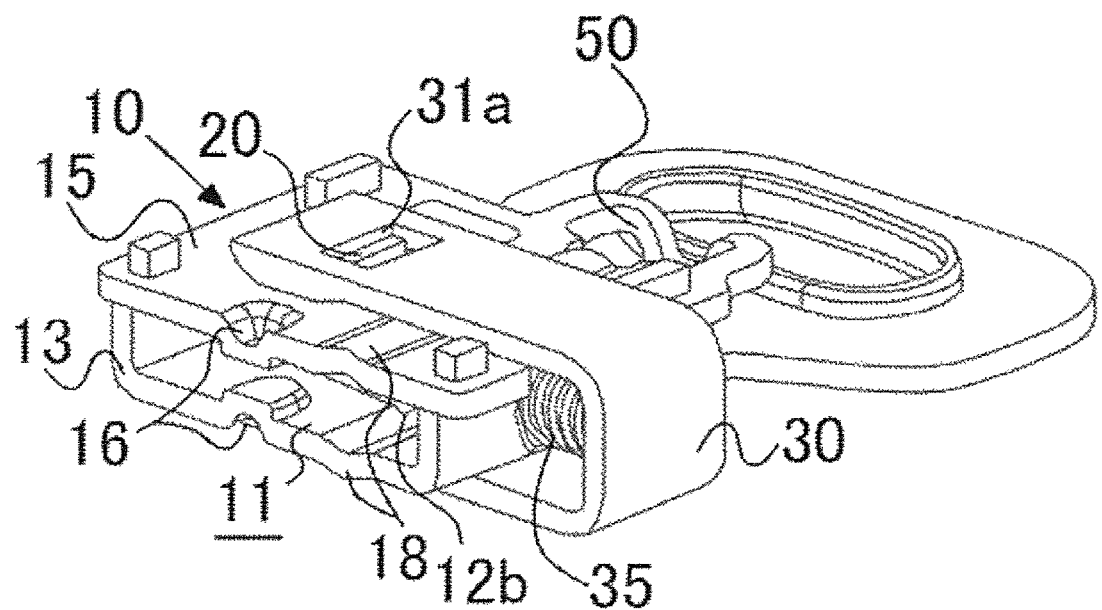
FIG. 4A is a perspective diagram showing a state of an unlocking member being externally fitted over a base member.

FIG. 4A shows a perspective diagram showing a state of the unlocking member 30 being externally fitted over the base member 10. As shown in FIG. 4A, the surfaces of the first plate 13 and second plate 15 facing each other are partially bent toward the opposite plates to have crushed portions 16, respectively, which function as a position restricting portion for restricting moves of a tongue inserted. This enables a tongue inserted to be restricted from moving in the respective sliding directions ($X_1$ and $X_2$ directions, see FIG. 3) of the slide grooves 12a and 12b. The crushed portions 16 may be formed on at least either one of the first plate 13 and the second plate 15.

The surfaces of the first plate 13 and second plate 15 facing each other further have guide portions 18, respectively, which are configured to guide the ejector spring 45 from the side from which the tongue 101 is inserted toward a stopper member 50, in order to facilitate assembling of the ejector spring 45. For the formation of the guide portions 18, the surfaces of the first plate 13 and the second plate 15 facing each other are bent outward to match the diameter of the ejector spring. This makes it possible to assemble the ejector spring 45 easily by inserting it from the side from which the tongue 101 is inserted toward the stopper member 50 substantially horizontally while guiding it over the guide portions 18. The guide portions 18 may be formed on at least either one of the first plate 13 and the second plate 15.

Figure 4B:
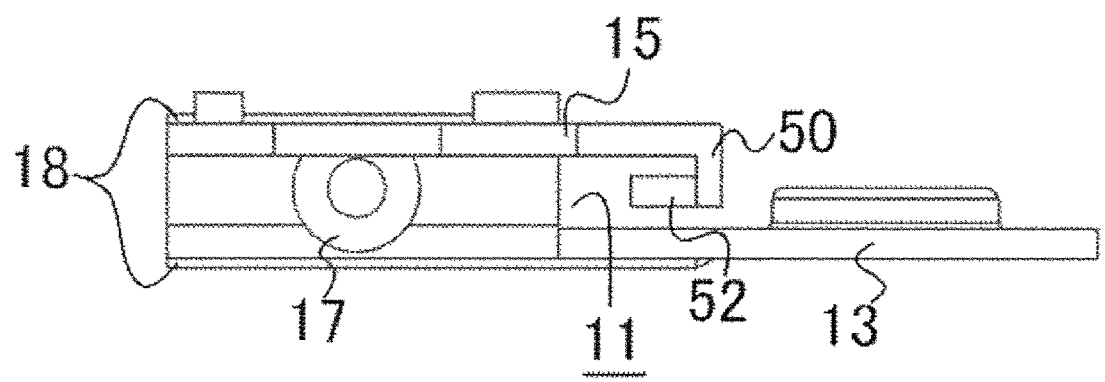
FIG. 4B is a side elevation of a base member.

FIG. 4B shows a side elevation of the base member 10. As shown in FIG. 4B, a side surface of the first plate 13 at a side at which the unlocking member 30 is externally fitted has a positioning groove 17 over which one end side of the latch spring 35 is externally fitted.

The stopper member 50, which defines the inner region 11 at the deepest position in the inserting direction I of the tongue 101, is formed integrally with the second plate 15. The stopper member 50 has a protrusion 52 over which one end side of the ejector spring 45 is externally fitted. Integral formation of the stopper member 50 with the second plate 15 makes it possible to assemble a buckle for a connector easily, and to reduce the number of parts included to enable a simpler structure.

The latch member 20 is made of a columnar member, and disposed inserted through the slide grooves 12a and 12b such that both ends thereof stick out from the first plate 13 and the second plate 15 (see FIG. 3). The latch member 20 is locked with the locking groove 102 of the tongue 101 inserted, by sliding in the first sliding direction $X_1$ that is along a groove inward direction of the locking groove 102 when it is at the locking groove 102.

The unlocking member 30 is made of a member having substantially a squared-U shape as a whole, externally fitted over the base member 10 with an open mouth thereof ahead, and supported in the externally fitted state with locking support portions 31a and 31b thereof locked with the both ends of the latch member 20 sticking out from the base member 10 (see FIG. 3 and FIG. 4A), the locking support portions being formed in both of facing surfaces of the unlocking member, respectively. The locking support portions 31a and 31b are formed by machining the unlocking member 30 to match the shape of the latch member.

A surface of the unlocking member that faces a side surface of the base member 10 has a protrusion 32 on which one end of the latch spring 35 is supported (see FIG. 7D described below).

The latch spring 35 is inserted between the base member 10 and the unlocking member 30, and biases the unlocking member 30 in the first sliding direction $X_1$. The latch spring 35 is not particularly limited, but is a coil spring, here. In this case, the latch spring 35 is installed on the buckle for a connector 1 in a stable state with the ends thereof supported on the positioning groove 17 of the first plate 13 and on the protrusion 32 of the unlocking member 30, respectively (see FIG. 3, FIG. 4A, FIG. 4B, and FIG. 7D).

Figure 5:
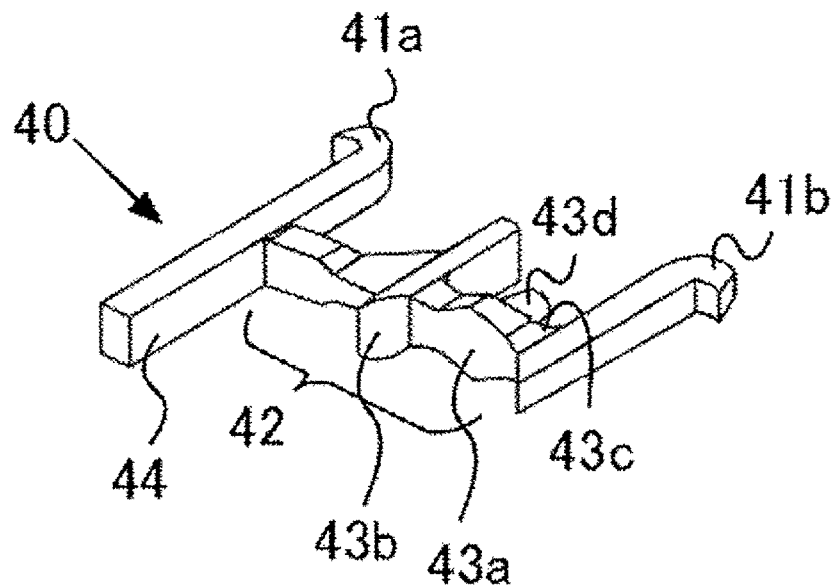
FIG. 5 is a perspective diagram of an ejector.

The ejector 40 is disposed in the inner region 11 of the base member 10 by being inserted thereinto along the inserting direction I of the tongue 101 (see FIG. 3). Here, the specific structure of the ejector 40 will be described with reference to FIG. 5. FIG. 5 is a perspective diagram of the ejector 40.

The ejector 40 includes: two arms 41a and 41b that extend in the inserting direction 1, and are inserted into the base member 13 from outside by being slid against the side walls of the first plate 13, respectively; and a body section 42 held between the arms 41a and 41b, and including a pushing/moving surface 43a to be pushed and moved by the tongue 101, a support section 43b configured to support the latch member 20 slide in the second sliding direction $X_2$ (see FIG. 3), and a pushing surface 43c to be pushed by the ejector spring 45. Claws are formed at ends of the arms 41a and 41b so as to be locked with terminal ends of the both side walls of the first plate 13, respectively, the terminal ends being opposite to a starting end that is at a side from which the tongue 101 is inserted. The ejector 40 having this shape can be assembled on the base member 10 easily, and once assembled, can be maintained in the assembled state because the claws are locked with the terminal ends of the both side walls of the first plate 13 by resisting being biased by the ejector spring 45.

The pushing surface 43c has a protrusion 43d over which one end of the ejector spring 45 is supported.

As in the present embodiment, by forming the claws of the arms 41a and 41b so as to be locked with the terminal ends of the both side walls of the first plate 13 respectively, it is possible to insert and assemble the ejector 40 internally into the inner region of the base member 10 easily, and to realize a locked state stable against an external force with a simple structure, because the locked state after the assembly is not unlocked easily.

However, the present invention is not limited to the example of the present embodiment as long as the effect of the present invention is not spoiled, and the structure of the claws may be changed such that they are locked with an arbitrary aperture of the base member that is positioned at the terminal end side. For example, they may be constructed such that the claw of the arm 41a is locked with a terminal end of the second plate 15 and the claw of the arm 41b is locked with the terminal end of the side wall of the first plate 13. Alternatively, they may be constructed such that the claw of the arm 41a is locked with the terminal end of the side wall of the first plate 13 and the claw of the arm 41b is locked with the terminal end of the second plate 15.

The ejector 40 also includes a columnar gripping portion 44 that extends in a releasing direction E (see FIG. 3) of the tongue from a base end of the arm 41a, which is one of the arms 41a and 41b that is inserted internally into the base member 10 by being slid against such a side surface of the first plate that is opposite to a side surface thereof at a side at which the unlocking member 30 is externally fitted. It is possible to perform the assembling work more efficiently, by gripping the gripping portion 44 and inserting the ejector 40 internally into the inner region of the base member 10.

The ejector spring 45 is inserted between the stopper member 50 of the second plate 15 and the pushing surface 43c of the ejector 40, and biases the ejector 40 in the releasing direction E of the tongue 101 in a state of being disposed in the inner region 11 of the base member 10. Here, the ejector spring 45 is a coil spring, which provides stable support of the coil spring because both ends of the coil spring are supported on the protrusion 52 of the stopper member 50 and on the protrusion 43d of the pushing surface 43c, respectively.

Next, operations of engaging the tongue 101 with and disengaging it from the buckle for a connector 1 will be described.

Figure 6A:
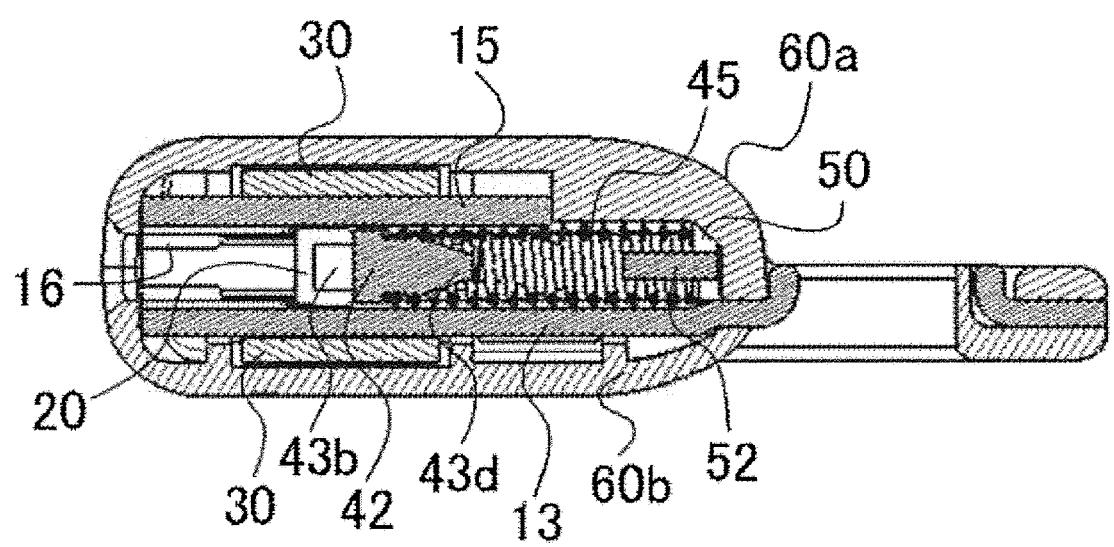
FIG. 6A is a cross-sectional diagram of FIG. 2A taken along a line A-A.
Figure 6B:
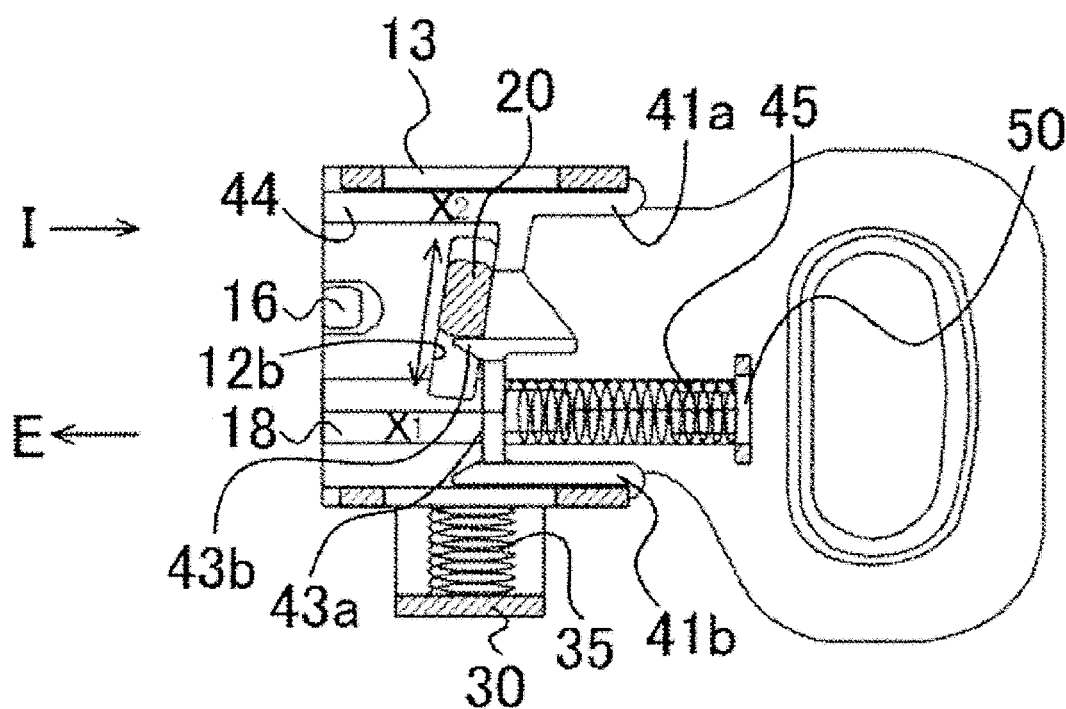
FIG. 6B is a cross-sectional diagram of FIG. 2B taken along a line B-B, showing a state of a cover member being removed.
Figure 6C:
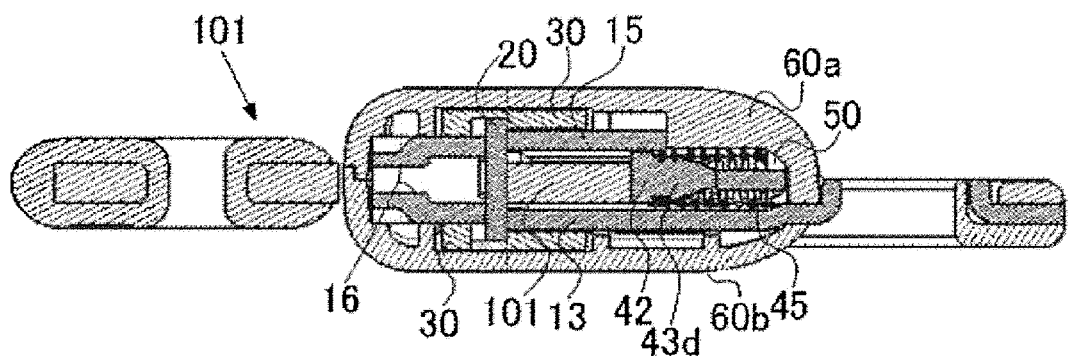
FIG. 6C is a cross-sectional diagram of FIG. 2C taken along a line C-C.
Figure 6D:
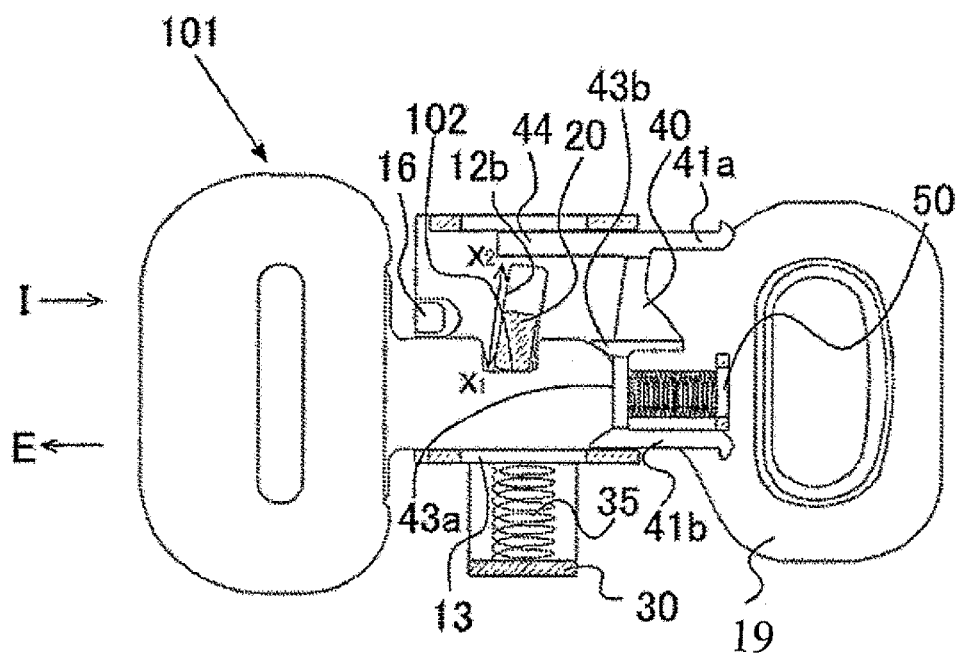
FIG. 6D is a cross-sectional diagram of FIG. 2D taken along a line D-D, showing a state of a cover member being removed.

FIG. 6A is a cross-sectional diagram of FIG. 2A taken along a line A-A. FIG. 6B is a cross-sectional diagram of FIG. 2B taken along a line B-B, showing a state of a cover member being removed. FIG. 6C is a cross-sectional diagram of FIG. 2C taken along a line C-C. FIG. 6D is a cross-sectional diagram of FIG. 2D taken along a line D-D, showing a state of a cover member being removed.

First, an initial state (a disengaged state) of the tongue 101 before inserted will be described with reference to FIG. 6A and FIG. 6B.

In the initial state, the latch member 20 is supported by the support section 43b of the ejector 40 in a state of being biased in the first sliding direction $X_1$ of the slide groove 12b by the unlocking member 30 biased by the latch spring 35. The position of the latch member 20 in this state is the initial position of the latch member 20.

Further, the ejector 40 is supported by the claws of the arms 41a and 41b being locked with the terminal ends of the side walls of the first plate 13 in a state of being biased in the releasing direction E of the tongue 101 by the ejector spring 45. The position of the ejector 40 in this state is the initial position of the ejector 40.

When the tongue 101 is inserted along the inserting direction I from this initial state, the pushing/moving surface 43a of the ejector 40 is pushed and moved by the leading end of the tongue 101, which moves the ejector 40 from the initial position thereof to a position closer to the stopper member 50 along the inserting direction I.

When the ejector 40 is moved closer to the stopper member 50, the support section 43b of the ejector 40 is released from supporting the latch member 20, which enables the latch member 20 to move from the initial position thereof more into the first sliding direction $X_1$, and to slide in the groove inward direction (i.e., a direction along the sliding direction $X_1$) when it is at the locking groove 102 of the tongue 101 inserted, to be locked with the locking groove 102.

Next, an engaged state of the tongue 101 that is inserted will be described with reference to FIG. 6C and FIG. 6D. As shown in these drawings, the latch member 20 is locked with the locking groove 102 of the tongue 101, which brings the tongue 101 and the buckle for a connector 1 into an engaged state. Here, the tongue 101 is restricted, by a side surface of the first plate 13 and the crushed portions 16 formed at a position facing this side surface, from moving in any sliding direction, which keeps the tongue 101 and the buckle for a connector 1 in the engaged state even when a large external force is applied.

When the tongue 101 and the buckle for a connector 1 are to be released from the engaged state, first, a vehicle key, a tongue of an adjacent seat, or the like is inserted through a manipulation hole 62 (see FIG. 3) formed in the lower cover, and a pushing operation is given with this vehicle key or the like to slide the unlocking member 30 along the second sliding direction $X_2$ to thereby slide the latch member 20 locked and supported by the unlocking member 30 more into the second sliding direction $X_2$ of the slide groove 12b beyond the initial position thereof.

When the latch member 20 is slid in the sliding direction $X_2$, it is released from the state of being locked with the locking groove 102 of the tongue 101.

When the latch member 20 and the tongue 101 are released from being locked, the tongue 101 is pushed out in the releasing direction E by the ejector 40 biased by the ejector spring 45, and the latch member 20 comes to be supported by the support section 43b of the ejector 40 at the position at which the tongue is pushed out (i.e., the initial position of the ejector 40).

Through this, the tongue 101 and the buckle for a connector 1 are disengaged, and the buckle for a connector 1 returns to the initial state described above.

The buckle for a connector 1 configured as described above can provide a buckle for a connector having a small and simple structure that is easy to assemble.

Finally, a method for assembling the buckle for a connector 1 will be described. FIG. 7A to FIG. 7H are process drawings (1) to (8) showing the steps of assembling the buckle for a connector.

Figure 7A:
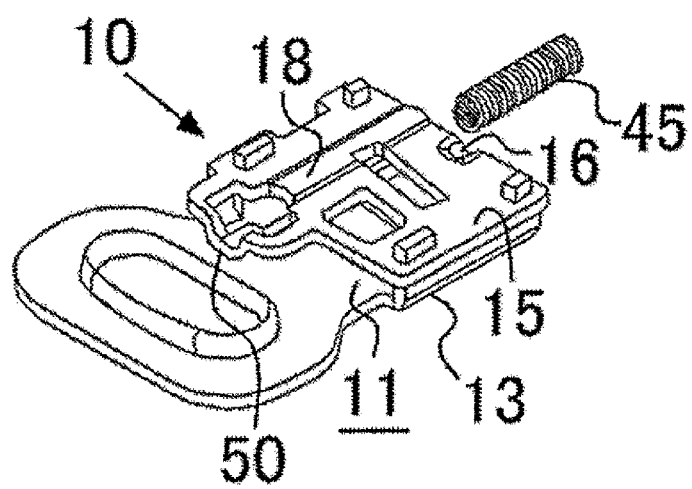
FIG. 7A is a process drawing (1) showing a step of assembling a buckle for a connector.

First, the ejector spring 45 is inserted into the inner region 11 of the base member 10 composed of the first plate 13 and the second plate 15 (see FIG. 7A). Here, the ejector spring 45 can be inserted from the side from which the tongue is inserted, substantially horizontally from the starting end of the base member toward the terminal end thereof. Further, when the base member 10 has the guide portions 18, it is easier to insert the ejector spring.

Figure 7B:
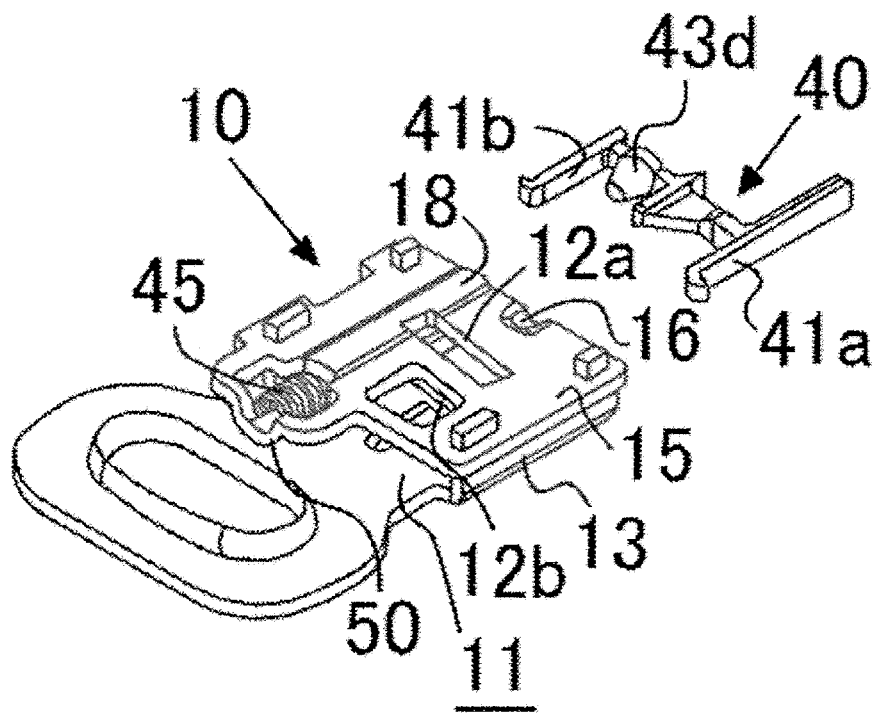
FIG. 7B is a process drawing (2) showing a step of assembling a buckle for a connector.

Next, the ejector 40 is inserted into the inner region 11 of the base member 10 (see FIG. 7B). Here, the ejector 40 is inserted with its arms 41a and 41b slid against the side walls of the first plate 13 respectively, and is assembled with the claws at the ends of the arms 41a and 41b locked with the terminal ends of the both side walls of the first plate 13. When assembled in this way, the ejector 40 can be inserted from the side from which the tongue is inserted, substantially horizontally from the starting end of the base member 10.

Here, the ejector 40 and the ejector spring 45 are assembled separately. However, in such a case as when there are no guide portions 18, the ejector 40 in a state of supporting the ejector spring 45 on the protrusion 43d thereof may be assembled on the base member 10 (hereinbefore, an ejector assembling step).

Figure 7C:
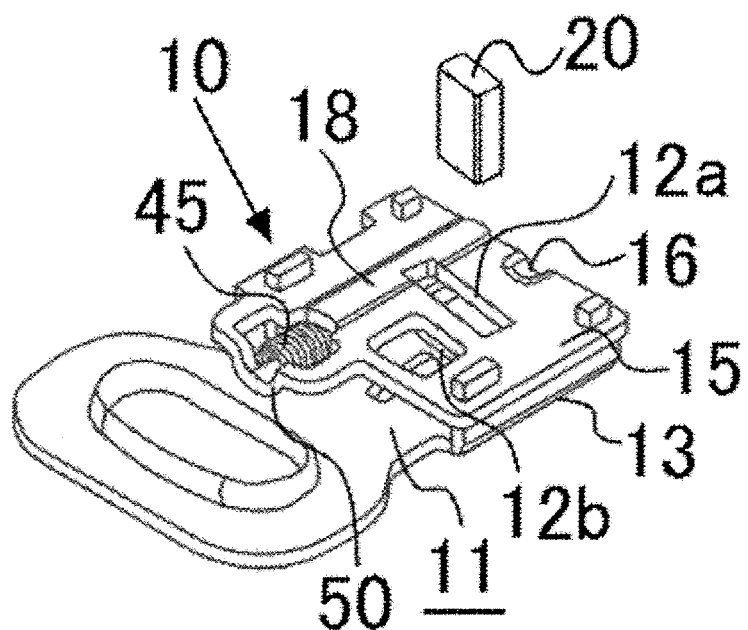
FIG. 7C is a process drawing (3) showing a step of assembling a buckle for a connector.

Next, the latch member 20 is disposed to be inserted through the slide grooves 12a and 12b of the base member 10 (a latch member assembling step, see FIG. 7C).

Figure 7D:
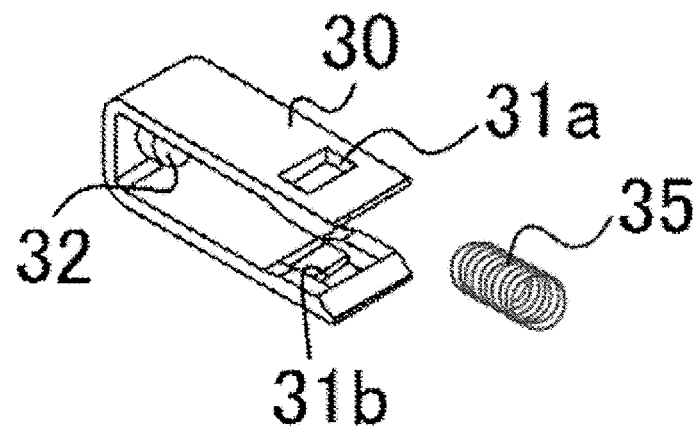
FIG. 7D is a process drawing (4) showing a step of assembling a buckle for a connector.

Next, the latch spring 35 is attached on the protrusion 32 of the unlocking member 30 (see FIG. 7D).

Figure 7E:
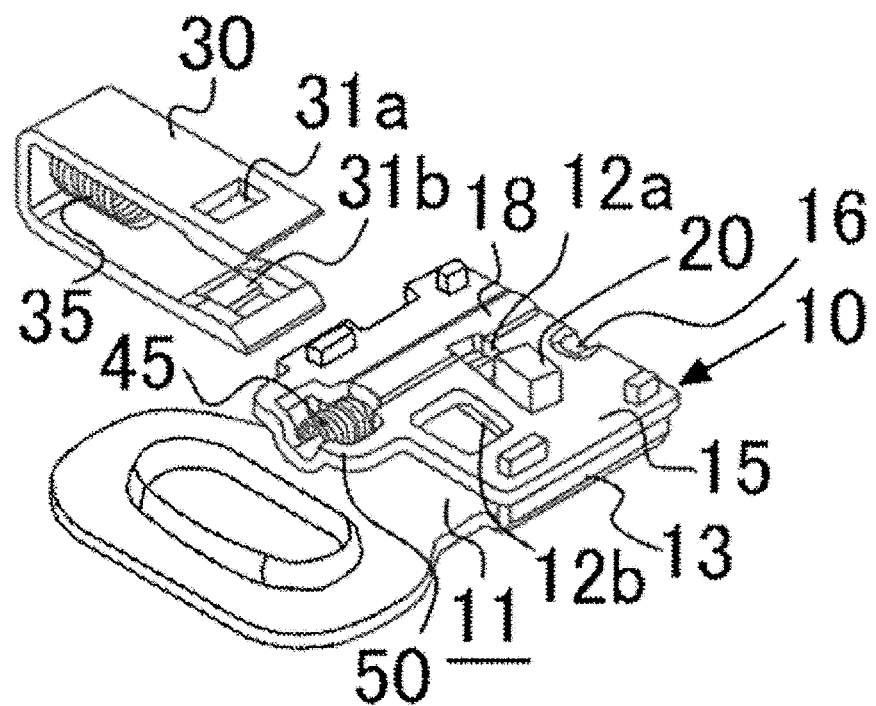
FIG. 7E is a process drawing (5) showing a step of assembling a buckle for a connector.

Next, the unlocking member is externally fitted over the base member 10 via the latch spring 35, and the locking support portions 31a and 31b of the unlocking member 30 are locked with the latch member 20 (hereinbefore, an unlocking member assembling step, see FIG. 7E).

Figure 7F:
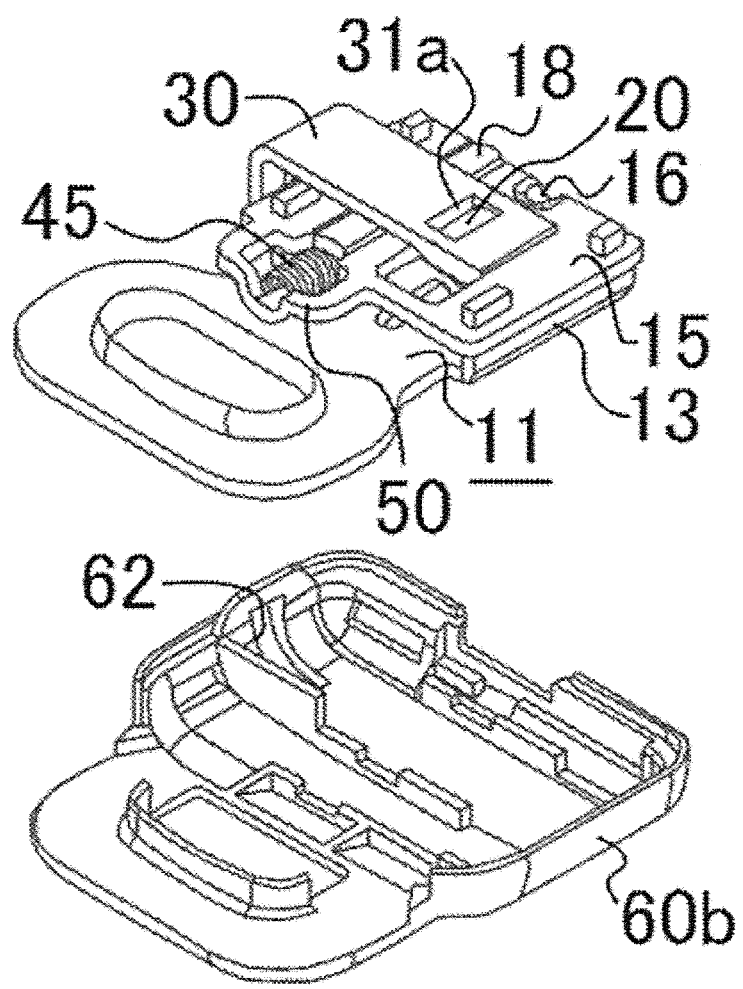
FIG. 7F is a process drawing (6) showing a step of assembling a buckle for a connector.

Next, the base member 10 is set in the lower cover 60b (see FIG. 7F).

Figure 7G:
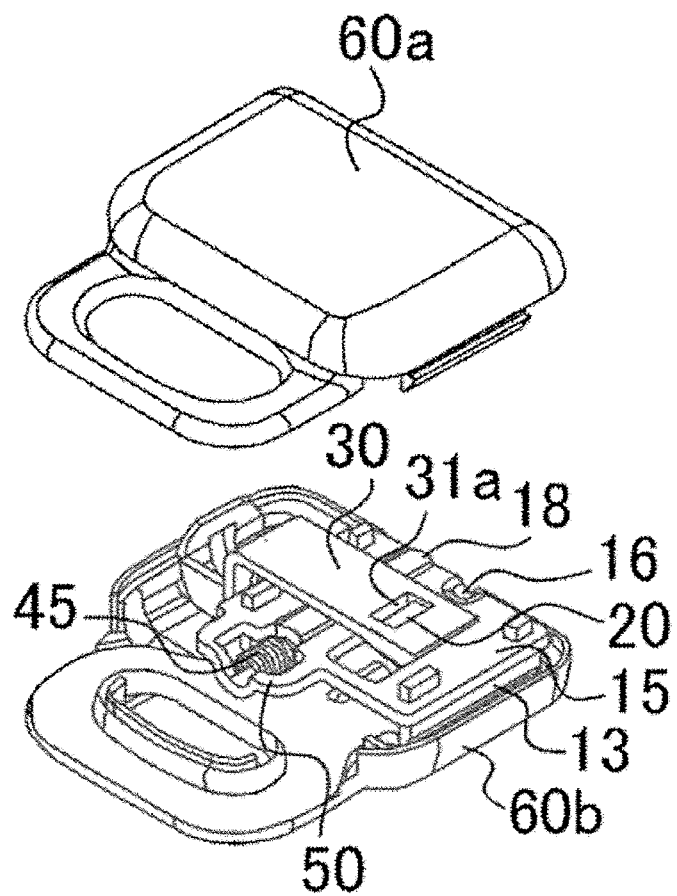
FIG. 7G is a process drawing (7) showing a step of assembling a buckle for a connector.

Then, the upper cover 60a is fitted with the lower cover 60b such that the base member 10 is housed thereinside (hereinbefore, a cover member assembling step, see FIG. 7G).

Figure 7H:
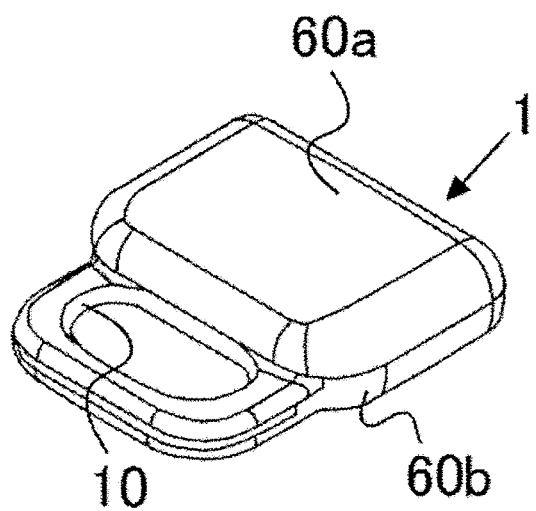
FIG. 7H is a process drawing (8) showing a step of assembling a buckle for a connector.

In this way, the assembly of the buckle for a connector 1 is completed (see FIG. 7H). According to such an assembling method, it is possible to insert and assemble the ejector 40 and the ejector spring 45 into the inner region 11 of the base member 10 substantially horizontally from the side from which the tongue is inserted, which facilitates the assembly. Particularly, with diagonal assembling eliminated, it is easy to introduce a mechanical assembly device, and a significant improvement in the productivity can be expected.

REFERENCE SIGNS LIST 1 buckle for connector
10, 110 base member
11, 111 inner region
12a, 12b, 112 slide groove
13 first plate
15 second plate
16 crushed portion
17 positioning groove
18 guide portion
19, 61a, 61b ring portion
20, 120 latch member 30, 130 unlocking member
31a, 31b, 131a, 131b locking support portion
32, 43d, 52 protrusion
40, 140 ejector
41a, 41b arm
42 body section
43a pushing/moving surface
43b support section
43c pushing surface
44 gripping portion
45 ejector spring
50, 150 stopper member
60a, 160a upper cover
60b, 160b lower cover
62, 162 manipulation hole
100 connector buckle
135 leaf spring
145 coil spring
161 screw
$X_1$ first sliding direction
$X_2$ second sliding direction
I inserting direction
E releasing direction

The invention claimed is:

1. A buckle for a connector, comprising:
a metallic base member that comprises an inner region into which a tongue having a locking groove in a side thereof along an inserting direction can be inserted, and slide slots formed in both facing surfaces of the base member, respectively;
a columnar latch member inserted through the slide slots of the base member and disposed such that both ends thereof stick out from the base member, the latch member configured to slide within the slide slots in a first sliding direction to lock with the locking groove of the tongue;
a U-shaped unlocking member having facing surfaces that define an open mouth, the facing surfaces being externally fitted over the base member, the facing surfaces comprising respective locking support portions, the locking support portions being configured to be locked with the both ends of the latch member sticking out from the base member such that the unlocking member is supported in an externally fitted state, the unlocking member being configured to slide the latch member in a second sliding direction opposite to the first sliding direction when a pushing operation is given from outside, to unlock the tongue and the latch member from each other;
a latch spring inserted between the base member and the unlocking member, and configured to bias the unlocking member in the first sliding direction to support the tongue and the latch member in a locked state;
an ejector provided in the inner region of the base member, and configured to push out the tongue in a releasing direction opposite to the inserting direction during unlocking of the tongue and the latch member, wherein the ejector, in an unlocked state, is configured to support the latch member, wherein, when the tongue is inserted into the inner region of the base member, the tongue pushes the ejector away from the latch member, enabling the latch member to be locked with the tongue;
an ejector spring inserted between a stopper member and the ejector and configured to bias the ejector in the releasing direction of the tongue, the stopper member providing a deepest position to which the tongue is capable of being inserted into the inner region of the base member; and
a cover member housing the base member, the latch member, the unlocking member, the latch spring, the ejector, and the ejector spring,
wherein the buckle is configured to support the tongue engageably and disengageably,
wherein the base member comprises: a first plate, the first plate having a bottom surface and a first side wall and a second side wall opposably formed along the inserting direction, the first and second side walls defining an opening, and a second plate disposed to cover the opening of the first plate, the first and second plates together forming an aperture, and
wherein the ejector comprises: a first arm and a second arm extending along the inserting direction and configured to be inserted into the base member from outside by being slid against the side walls; a body section that is held between the first arm and the second arm and comprises a first pushing surface for the tongue, which is to be pushed and moved by the tongue, a support section configured to support the latch member in the unlocked state, and a second pushing surface to be pushed by the ejector spring; and claws formed at ends of the arms and configured to be locked with the aperture at a terminal end of the base member, the terminal end being opposite to a starting end that is at a side from which the tongue is inserted.

2. The buckle according to claim 1,
wherein the claws of the arms are locked with the terminal ends of the side walls of the first plate, respectively.

3. The buckle according to claim 1,
wherein the stopper member is formed integrally with the second plate.

4. The buckle according to claim 1,
wherein the latch spring is a coil spring, and the first plate comprises a positioning groove on the first side wall at a side at which the unlocking member is externally fitted, the positioning groove being configured to be locked with one end of the coil spring.

5. The buckle according to claim 1,
wherein the base member comprises a position restricting portion facing the first side-wall of the first plate at a side at which the unlocking member is externally fitted, the position restricting portion configured to prevent the tongue from moving along the second sliding direction when the tongue is inserted into the inner region.

6. The buckle according to claim 5,
wherein the position restricting portion is formed by forming a depression in part of at least one of the first plate and the second plate that extends into the aperture.

7. The buckle according to claim 1,
wherein the ejector comprises a columnar gripping portion extending in the releasing direction from a base end of the second arm, the second arm being inserted into the base member by being slid against a side surface opposite to a side surface at a side at which the unlocking member is externally fitted.

* * * * *